United States Patent [19]

Loehr

[11] Patent Number: 5,129,217
[45] Date of Patent: Jul. 14, 1992

[54] MULTIBLADE MULCHING MOWER

[75] Inventor: Thomas J. Loehr, Watertown, Wis.

[73] Assignee: Ransomes, Inc., Johnson Creek, Wis.

[21] Appl. No.: 655,307

[22] Filed: Feb. 14, 1991

[51] Int. Cl.$^5$ .................. A01D 34/66; A01D 34/68; A01D 34/73

[52] U.S. Cl. ..................... 56/13.6; 56/16.9; 56/295; 56/320.2

[58] Field of Search ............... 56/320.1, 320.2, 295, 56/255, 17.4, 16.9, 11.3, 11.8, 11.9, 13.6

[56] References Cited

U.S. PATENT DOCUMENTS

| | | | |
|---|---|---|---|
| 2,659,191 | 11/1953 | Miller et al. | |
| 2,734,327 | 2/1956 | Whitney | |
| 2,786,318 | 3/1957 | Caldwell et al. | |
| 2,836,024 | 5/1958 | Davis et al. | |
| 3,085,386 | 4/1963 | Slemmons | |
| 3,242,660 | 3/1966 | Gary | |
| 3,299,622 | 1/1967 | Hanson et al. | 56/17.5 |
| 3,531,923 | 10/1970 | Lay | 56/295 |
| 3,538,692 | 11/1970 | Cope et al. | 56/295 |
| 3,781,991 | 1/1974 | Stretton et al. | 56/295 X |
| 3,790,094 | 2/1974 | Spicer | 56/13.3 X |
| 3,795,095 | 3/1974 | Erickson et al. | 56/320.2 |
| 3,797,212 | 3/1974 | Pursel | 56/255 |
| 3,884,020 | 5/1975 | Dahl et al. | 56/320.2 |
| 3,925,968 | 12/1975 | Wagenhals | 56/13.3 |
| 3,974,629 | 8/1976 | Russell et al. | 56/13.7 |
| 3,998,037 | 12/1976 | Deans et al. | 56/295 |
| 4,057,952 | 11/1977 | Brokaw | 56/16.9 |
| 4,083,166 | 4/1978 | Haas | 56/13.7 |
| 4,087,955 | 5/1978 | Szymanis | 56/202 |
| 4,134,249 | 1/1979 | Wuerker et al. | 56/255 |
| 4,135,351 | 1/1979 | Akgulian | 56/255 |
| 4,189,903 | 2/1980 | Jackson et al. | 56/255 |
| 4,189,904 | 2/1980 | Paker | 56/255 |
| 4,194,345 | 3/1980 | Pioch et al. | 56/320.2 X |
| 4,196,568 | 4/1980 | Perry | 56/13.8 |
| 4,199,926 | 4/1980 | Petty | 56/295 |
| 4,205,512 | 6/1980 | Thorud | 56/13.4 |
| 4,262,476 | 4/1981 | Benenati | 56/295 |
| 4,263,771 | 4/1981 | Iaboni et al. | 56/13.4 |
| 4,266,074 | 10/1981 | Mullet et al. | 56/320.2 |
| 4,292,791 | 10/1981 | Lalonde | 56/255 |
| 4,306,409 | 12/1981 | Wulfers | 56/320.2 |
| 4,307,844 | 12/1981 | Caron | |
| 4,318,268 | 3/1982 | Szymanis | 56/255 |
| 4,326,370 | 4/1982 | Thorud | 56/202 |
| 4,351,144 | 9/1982 | Benenati | 56/295 |
| 4,364,221 | 12/1982 | Wixom | 56/13.6 X |
| 4,397,136 | 8/1983 | McLeod | 56/500 |
| 4,435,949 | 3/1984 | Heismann | 56/320.2 |
| 4,450,673 | 5/1984 | Hutchison | 56/17.5 |
| 4,464,886 | 8/1984 | Carter | 56/13.8 |
| 4,617,788 | 10/1986 | Sebastian | 56/295 |
| 4,686,819 | 8/1987 | Bryant | 56/295 |
| 4,879,867 | 11/1989 | Wenzel | 56/11.3 X |
| 4,916,887 | 4/1990 | Mullet et al. | 56/320.2 X |
| 4,920,734 | 5/1990 | Wenzel | 56/11.3 X |
| 4,951,449 | 8/1990 | Thorud | 56/320.1 X |
| 5,035,108 | 7/1991 | Meyer et al. | 56/320.2 X |

FOREIGN PATENT DOCUMENTS

| | | | |
|---|---|---|---|
| 164542 | 8/1955 | Australia | |
| A25297/84 | 2/1984 | Australia | |
| 72960/87 | 5/1987 | Australia | |
| A79732/87 | 10/1987 | Australia | |
| 2427743 | 12/1975 | Fed. Rep. of Germany | |
| 233916 | 3/1986 | Fed. Rep. of Germany | 56/320.1 |
| 3507517 | 9/1986 | Fed. Rep. of Germany | |
| 1183174 | 3/1970 | New Zealand | |
| 427120 | 4/1935 | United Kingdom | |
| 2077564 | 5/1979 | United Kingdom | |
| 1574189 | 9/1980 | United Kingdom | |
| 1584495 | 2/1981 | United Kingdom | |

Primary Examiner—Stephen J. Novosad
Attorney, Agent, or Firm—Reinhart, Boerner, Van Deuren, Norris & Rieselbach

[57] ABSTRACT

A multiblade mulching rotary lawn mower. A multiblade mower has a removably affixed mulching housing coupled to the mower deck top wall and is overlying an associated cutting blade. Mulching operation can be carried out without closing any discharge port, and the mower can readily be changed between mulching and nonmulching operation by removal of the mulching housings.

21 Claims, 4 Drawing Sheets

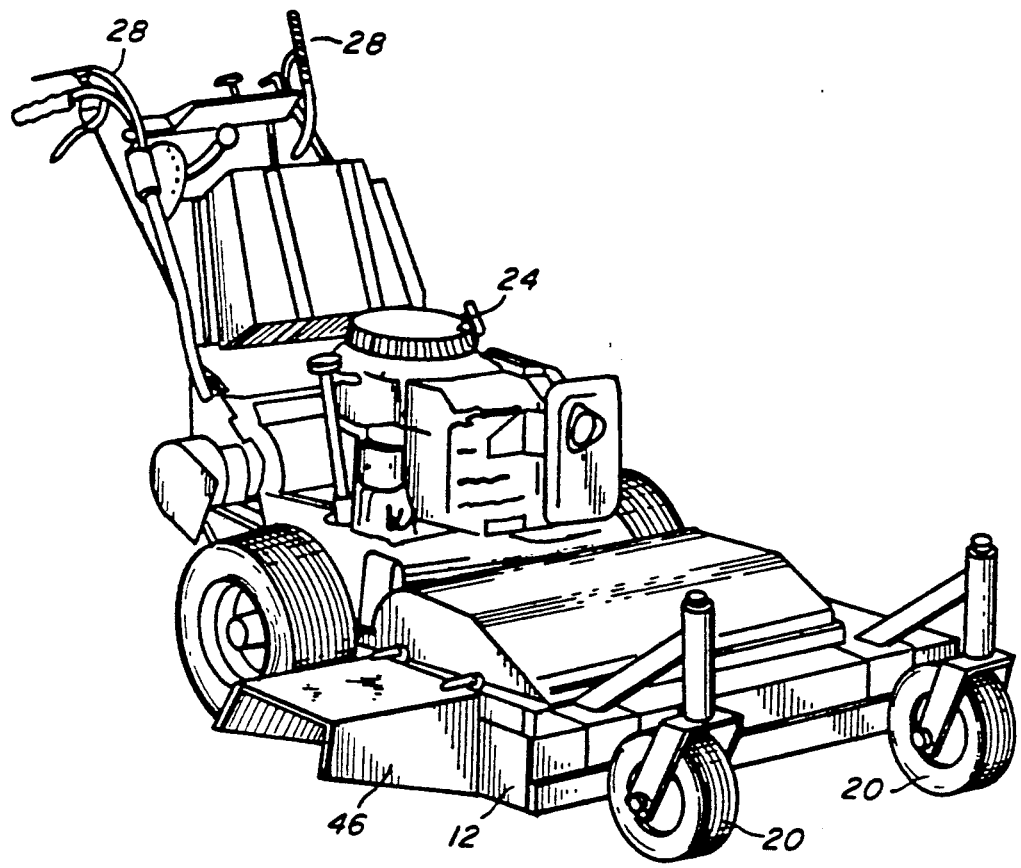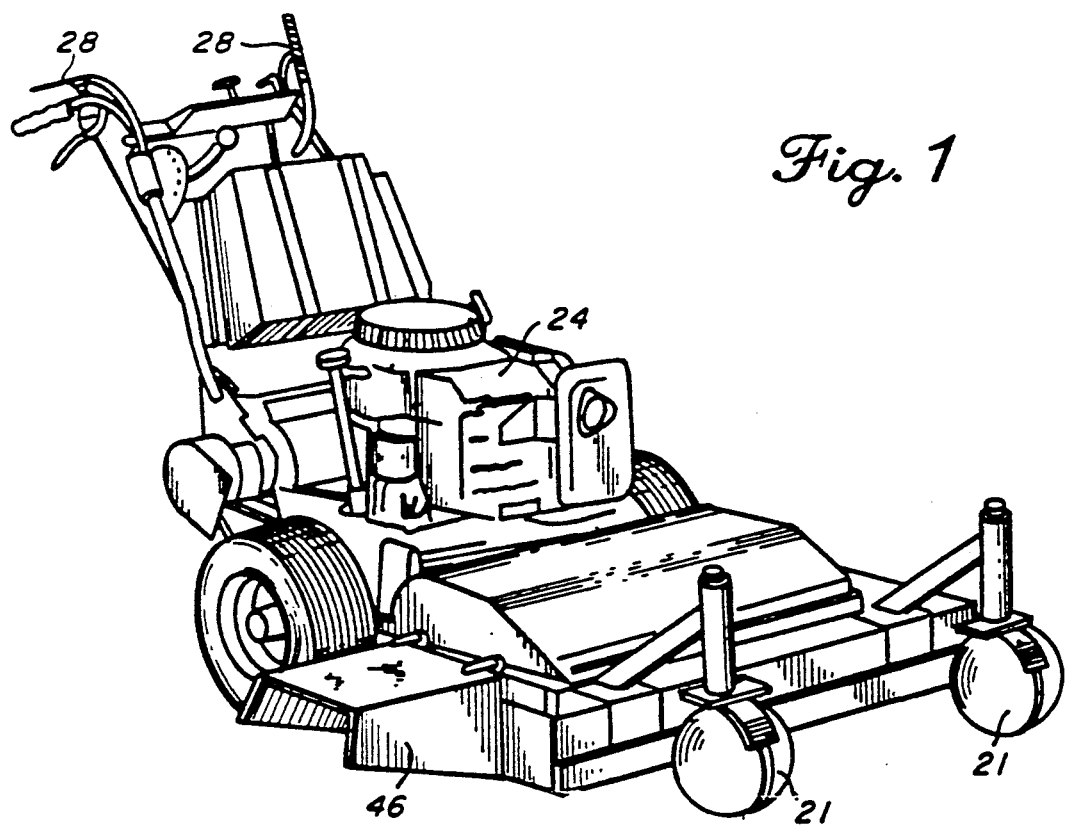
Fig. 1

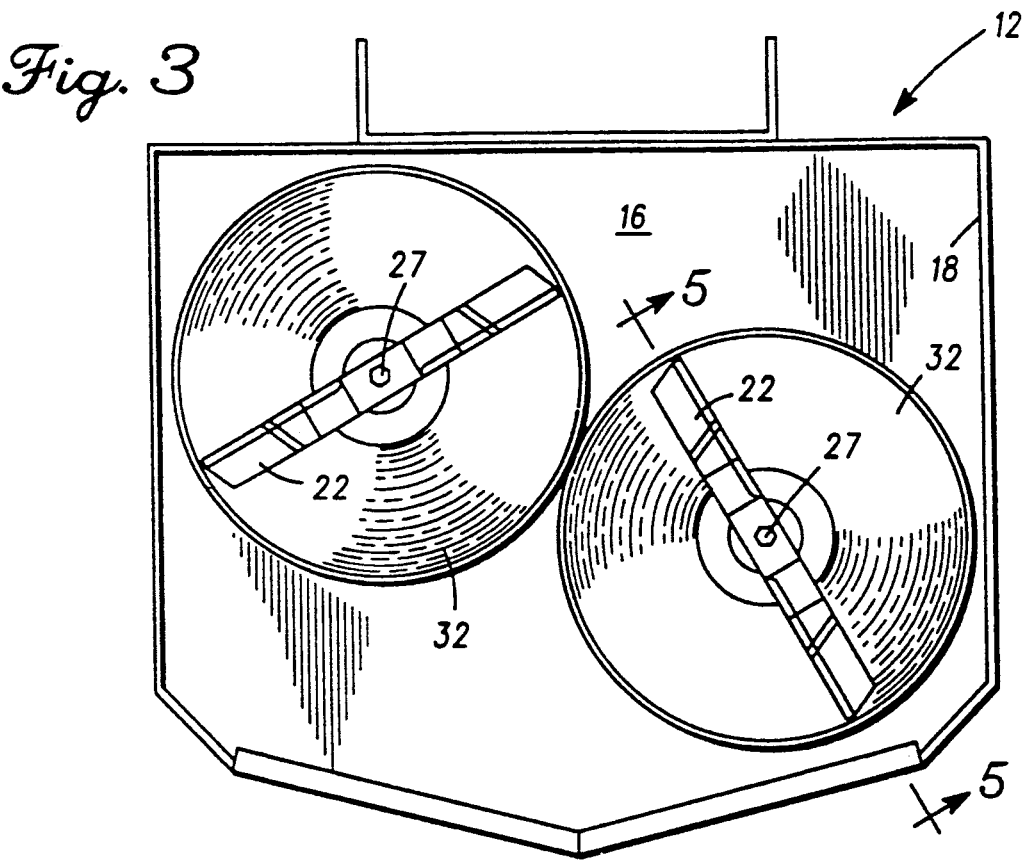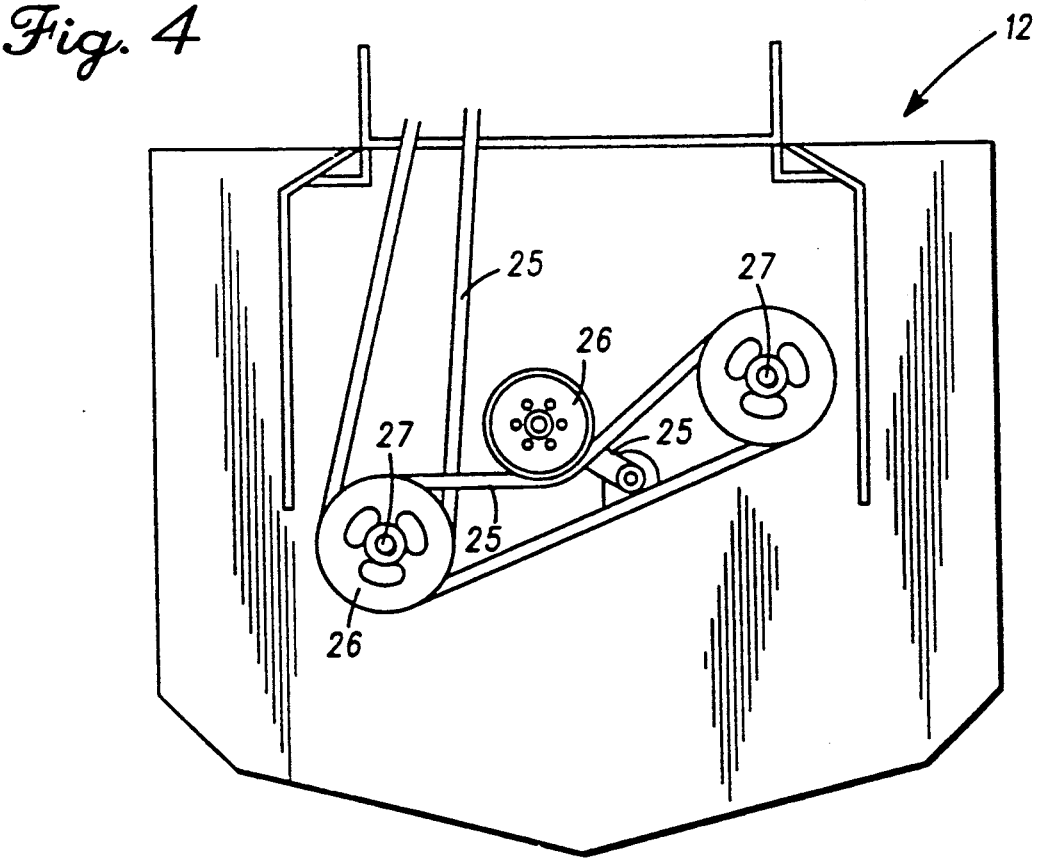

MULTIBLADE MULCHING MOWER

The present invention is directed generally to a multiblade mulching rotary lawn mower. More particularly, the invention is directed to a multiblade mower having a removably affixed mulching housing coupled to the mower deck top wall and overlying an associated cutting blade.

As a consequence of environmental laws and codes, it is becoming increasingly important to be able to operate lawn mowers in a mulching mode at least part of the time. Conventional approaches to solve this problem typically have involved the use of mulching blades in the mower (see, for example, U.S. Pat. Nos. 3,998,037; 4,083,166; 4,262,476; 4,292,791 and 4,351,144 which are incorporated by reference herein) or the construction of complex mower deck structures (see, for example, U.S. Pat. Nos. 4,134,149; 4,135,351; 4,189,903; 4,189,904; 4,196,568; 4,205,512; 4,263,771 and 4,450,673 which are incorporated by reference herein). These solutions however require time consuming change of the mulching blade or change of the mower deck housing to convert between mulching and nonmulching operation. Moreover, it has proven particularly difficult to readily carry out such a conversion of a multiblade mower, and frequently, attempts to operate a multiblade mower as a mulching mower have resulted in uneven distribution of the mulched lawn cuttings.

It is therefore an object of the invention to provide an improved multiblade mulching rotary lawn mower.

It is another object of the invention to provide a novel multiblade mulching lawn mower having a removable mulching housing.

It is an additional object of the invention to provide an improved multiblade mulching mower deck.

It is a further object of the invention to provide an improved multiblade mulching mower deck having a removable mulching housing concentrically disposed over associated cutting blades.

It is yet another object of the invention to provide a novel multiblade, mulching lawn mower deck having a mulching means enabling cutting of vegetation in a given area and deposition of mulched vegetation in substantially the same area from which the vegetation has been cut.

It is still an additional object of the invention to provide an improved multiblade mower deck having a mulcher housing disposed within the mower deck housing but unattached to the mower deck side walls.

It is yet a further object of the invention to provide a novel multiblade lawn mower operable in a mulching or nonmulching mode leaving the discharge chute open at all times.

Further objects and advantages of the invention will be described in the following detailed description and brief description of the drawings wherein like reference numerals refer to like elements throughout the several drawings.

BRIEF DESCRIPTION OF THE DRAWINGS

FIG. 1 illustrates two walk behind multiblade mowers having a mower deck;

FIG. 3 illustrates a bottom view of a two blade mower deck with overlying mulching housings;

FIG. 4 shows a bottom view of a pulley and belt drive system for a multiblade rotary mower deck.

DETAILED DESCRIPTION OF A PREFERRED EMBODIMENT

Figure 2:
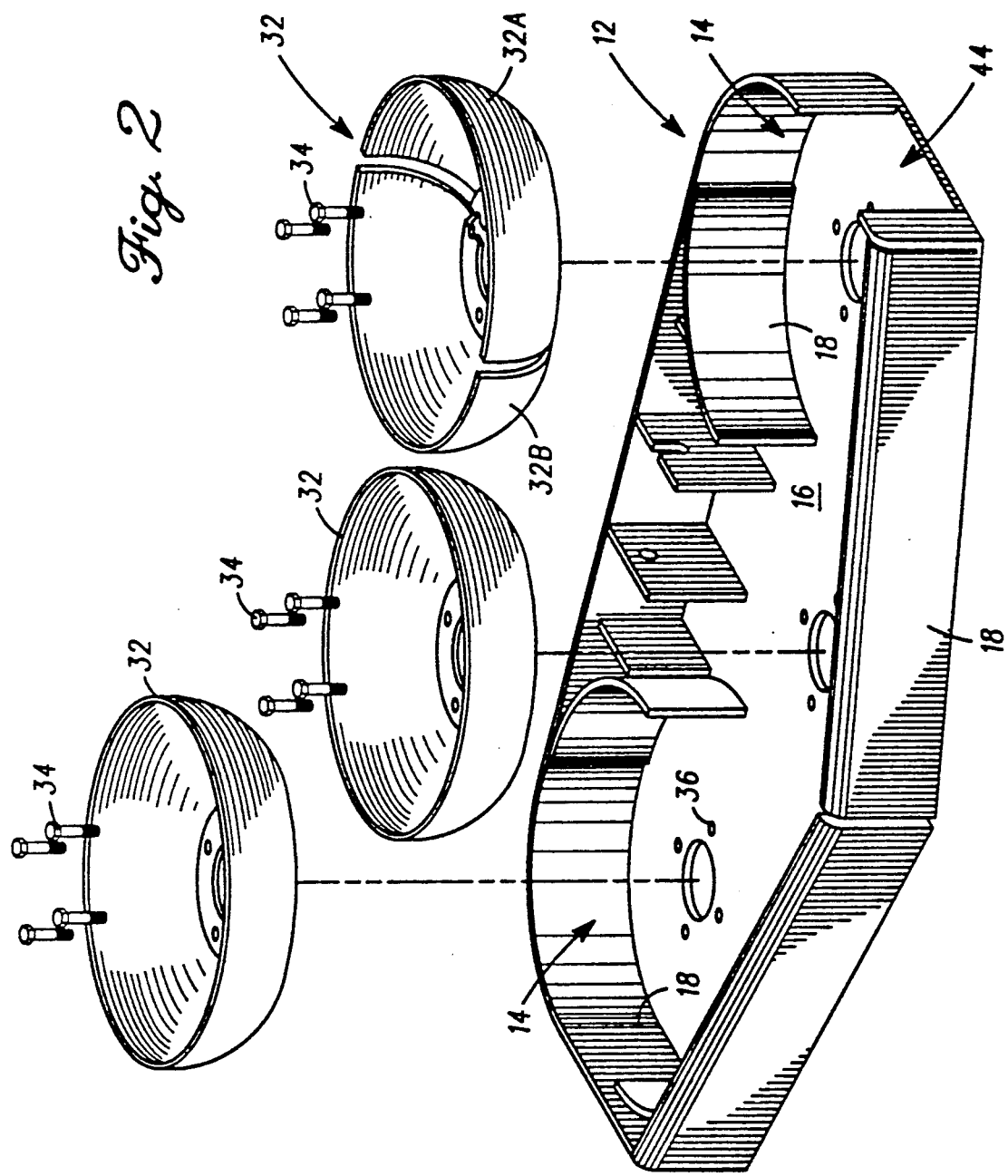
FIG. 2 shows an exploded bottom perspective view of a multiblade mower deck and associated mulcher mower housing for each blade cutting region.

A multiblade mulching rotary lawn mower constructed in accordance with the invention is shown generally in the figures at 10. A mower deck 12, best shown in FIG. 2, includes a blade housing 14 having a top wall 16 and a side wall 18 defining a downwardly directed opening for the mower deck 12 during mower operation. The multiblade mower 10 further includes means for moving the mower deck 12 along the ground, such as, wheels 20 or casters 21 shown in FIG. 1.

Figure 5:
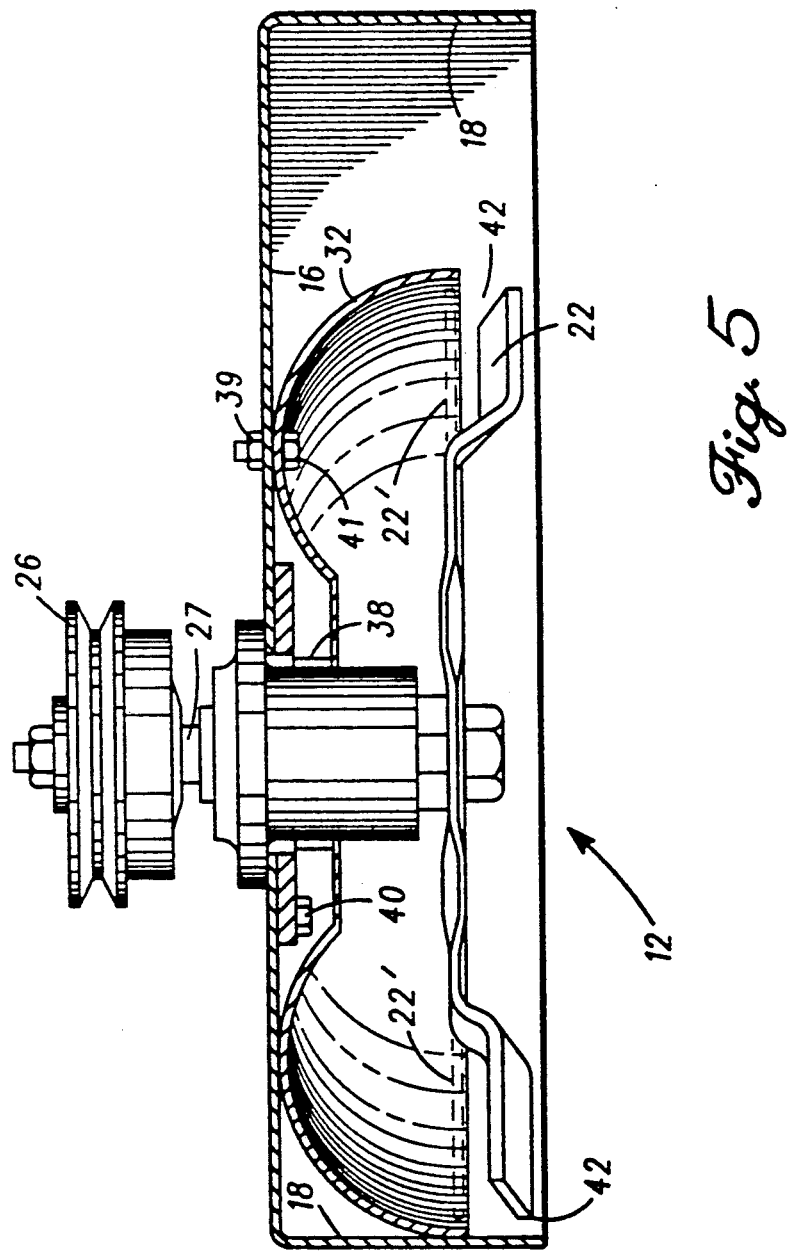
FIG. 5 illustrates a cross sectional side view taken along 5—5 in FIG. 3 of the mulcher housing and associated cutting blade within the mower deck.

The multiblade mower 10 further includes at least two cutting blades 22 shown in FIGS. 3 and 5 rotatably disposed within the blade housing 14. A motor means, such as internal combustion engine 24 in FIG. 1, is coupled to the cutting blades 22 via coupling means, such as belt drives 25 and pulley 26 shown in FIG. 4, to power the rotation of each of the cutting blades 22. The belt drive 25 is coupled to rotatable drive shaft 27 to which is mounted each of the cutting blades 22.

The multiblade mower 10 also includes operator means, such as a drive speed/cutting blade engagement and steering/braking control system 28. This system 28 controls power output from the motor 24 to the cutting blades 22 and also controls the direction and speed of movement of the lawn mower 10 and of the coupled mower deck 12 along the ground.

A mulching housing 32 is shown in FIG. 2 in an exploded view and also shown in FIG. 5 in a side cross sectional view. In one form of the invention shown in FIG. 2 the mulching housing 32 is removably attached using a fastener, such as threaded bolt 34 which can be engaged through mating bolt hole 36 with a nut (not shown). The coupled mulching housing 32 is therefore affixed in a stationary manner to the top wall 16 with only a minor amount of the mulching housing 32 disposed in adjacent contact with the top wall 16. In another form of the mulching housing 32 shown in FIG. 5, a cylindrical flange 38 extends upward from the central portion of the mulching housing 32 and is fixedly coupled to the top wall 16 by bolts 40. In addition, one can alternatively couple the mulching housing 32 to the mower deck 12 using a bolt 41 and nut 39 at the point where the torus of the mulching house 32 touches the upper wall 16.

The mulching housing 32 is shown as a removable element for the preferred embodiment but can be permanently attached in other forms of the invention. As shown in FIGS. 3 and 5, the mulching housing 32 is disposed in association with each of the cutting blades 22, and each of the mulching housings 32 is overlying the associated cutting blade 22. As shown in FIG. 2 the mower deck 12 can include additional cutting regions, such as the area defined by a third one of the mulching housings 32C. Therefore an additional one of the cutting blades 22 is in the middle and can be positioned to cut an area not covered by a mower design wherein the outer two cutting blades 22 do not cut overlapping areas of vegetation.

The mulching housing 32 is also disposed apart from the peripheral inside side wall 18; and as mentioned hereinbefore, the mulching housing 32 has only a limited mechanical fastening connection with the top wall 16 (see FIGS. 2 and 5). The mulching housing 32 has a downwardly facing opening, concentrically positioned relative to the rotational motion traced by the rotation of the associated cutting blade 22 (see FIG. 3).

In the most preferred form of the invention, the mulching housing 32 is a partial section of a torus as best seen in FIG. 5. In one form of the invention the cutting blade 22 is disposed at least partly in a substantially horizontal plane below the plane of the bottom of the mulching housing 32. In another form of the invention the blade 22' (shown in phantom in FIG. 5) is completely above the plane of the bottom of the mulching housing 32. In addition, radial ends 42 of the cutting blade 22, or blade 22', are disposed within the radius of the circle defined by the bottom edge of the mulching housing 32. As shown in FIG. 2, the mulching housing 32 can be in one piece or in split sections, such as two sections 32A and 32B. The use of such split sections can simplify removal and installation by not having to remove the associated cutting blade 22.

The mower deck 12 includes a discharge port 44 shown in FIG. 2, and the multiblade mower 10 typically includes a deflector chute 46 to direct the discharge of clippings and other debris during operation in the non-mulching mode. The mower deck 12 can also be operated in the mulching mode by installing the mulching housing 32 over each of the cutting blades 22. This mulching mode for the multiblade mower 10 can be instituted without closing off, or otherwise requiring any change in, the discharge port 44 or the deflector chute 46.

During operation of the multiblade mower 10, each of the cutting blades 22 and the associated mulching housing 32 cooperate to enable mulching of the cut lawn clippings. Moreover, the mulching housing 32 functions such that the grass or vegetation cut by each of the cutting blades 22 is mulched and substantially confined to the projected area of the mulching housing 32 associated with the cutting blade 22. In addition, there is no tendency for the high pressure side of the mower deck 12 to force clippings to the lower pressure side nearest the discharge port 44 which is left open in the preferred embodiment of the invention. In selected forms of the invention, various conventional mulching blades can be used for the cutting blades 22. Mulching blades have been found to be particularly effective in promoting thorough mulching in cooperation with the mulching housing 32.

While preferred embodiments of the invention have been shown and described, it will be clear to those skilled in the art that various changes and modifications can be made without departing from the invention in its broader aspects as set forth in the claims provided hereinafter.

What is claimed is:

1. A multiblade mulching rotary lawn mower, comprising:
   a mower deck comprising a blade housing including a top wall and a side wall defining a downwardly directed opening;
   means coupled to said mower deck for movement of said deck along the ground;
   at least two cutting blades rotatably disposed within said blade housing;
   motor means coupled to said cutting blades for powering the rotation of each of said cutting blades;
   operator means for controlling power output from said motor means to said cutting blades and for controlling the direction and speed of movement of said lawn mower along the ground; and
   a mulching housing removably affixed in a stationary manner to said mower deck top wall and disposed in association with each of said cutting blades within said blade housing, each said mulching housing overlying said associated cutting blade and disposed apart from the peripheral inside of said side walls and each of said mulching housings including a downwardly facing opening concentrically positioned relative to the rotational motion traced by each said associated cutting blade.

2. The multiblade mulching rotary lawn mower as defined in claim 1 wherein said mulching housing comprises a partial section of a torus.

3. The multiblade mulching rotary lawn mower as defined in claim 1 wherein at least a portion of said cutting blade is disposed in a horizontal plane below the plane of the bottom of said mulching housing.

4. The multiblade mulching rotary lawn mower as defined in claim 1 wherein at least a portion of said cutting blade is disposed in a horizontal plane above the plane of the bottom of said mulching housing.

5. The multiblade mulching rotary lawn mower as defined in claim 3 wherein the radial ends of said cutting blade are disposed within the radius of the circle defined by the bottom edge of said mulching housing.

6. The multiblade mulching rotary lawn mower as defined in claim 1 further including means for transferring power from said motor means to said rotatable blades.

7. The mower as defined in claim 6 wherein said means for transferring power comprises a belt and pulley system.

8. The mower as defined in claim 1 wherein said motor means comprises an internal combustion engine.

9. The mower as defined in claim 1 wherein said cutting blades are disposed in a substantially horizontal plane for cutting.

10. The rotary lawn mower deck as defined in claim 9 wherein said mulching housing is removable from said mower deck.

11. The rotary lawn mower deck as defined in claim 10 wherein said mulching housing comprises split section attachable to said mower deck without removal of said associated cutting blade.

12. A multiblade rotary lawn mower deck, comprising:
    a blade housing, including a top wall and a side wall defining a downwardly directed opening;
    means coupled to said mower deck for movement along the ground;
    at least two cutting blades rotatably disposed within said blade housing;
    means coupled to said cutting blades for transferring rotational power to each of said cutting blades; and
    a mulching housing removably affixed in a stationary manner to said top wall of mower deck and disposed within said blade housing, and said mulching housing overlying said cutting blade and disposed apart from the peripheral inside of said blade housing side walls and most of said mulching housing positioned apart from said top wall of said mower deck, said mulching housing including a downward facing opening and concentrically positioned relative to the rotational motion traced by said associated cutting blade.

13. The rotary lawn mower deck as defined in claim 12 further including a discharge port on said mower deck for output of lawn debris under nonmulching cutting operation.

14. The rotary lawn mower deck as defined in claim 13 wherein said discharge port remains open during mulching cutting operation of said mower deck.

15. The rotary lawn mower deck as defined in claim 12 wherein said means for movement along the ground comprises at least one of a wheel and a caster.

16. The rotary lawn mower deck as defined in claim 12 wherein said mulching housing comprises a partial section of a torus.

17. A multiblade lawn mower deck, comprising:
  a blade housing including a top wall and a side wall defining a downwardly directed opening and cutting area;
  wheel means coupled to said mower deck for movement along the ground;
  at least two cutting blades rotatably disposed within said blade housing;
  a means for transferring power to said cutting blades to power the rotation of said blades during cutting operation using said mower deck; and
  a mulching housing affixed in a stationary position within said blade housing, and said mulching housing disposed apart from the inside of said blade housing side and top walls, said mulching housing including a downward facing opening concentrically positioned relative to the rotational motion traced by said cutting blade during operation.

18. The multiblade rotary lawn mower deck as defined in claim 17 wherein said mulching housing operates in cooperation with said associated cutting blade to uniformly confine lawn clippings cut by each of said cutting blades substantially within the projected area of said mulching housing associated with each of said cutting blades.

19. The multiblade rotary lawn mower deck as defined in claim 17 wherein said mulching housing is removably disposed within said blade housing.

20. The multiblade rotary lawn mower deck as defined in claim 19 wherein said removable mulching housing comprises at least two elements.

21. The multiblade rotary lawn mower deck as defined in claim 17 wherein said cutting blade comprises a mulching blade.

* * * * *